(12) United States Patent
Subburaj et al.

(10) Patent No.: US 9,612,338 B2
(45) Date of Patent: Apr. 4, 2017

(54) METHOD TO IMPROVE SATELLITE SIGNAL DETECTION

(71) Applicant: Texas Instruments Incorporated, Dallas, TX (US)

(72) Inventors: Karthik Subburaj, Bangalore (IN); Karthik Ramasubramanian, Bangalore (IN); Jawaharlal Tangudu, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 799 days.

(21) Appl. No.: 14/037,052

(22) Filed: Sep. 25, 2013

(65) Prior Publication Data
US 2015/0015438 A1    Jan. 15, 2015

(30) Foreign Application Priority Data
Jul. 12, 2013    (IN) ............................ 3129/CHE/2013

(51) Int. Cl.
*G01S 19/24*    (2010.01)
*G01S 19/25*    (2010.01)

(52) U.S. Cl.
CPC ............ *G01S 19/24* (2013.01); *G01S 19/246* (2013.01); *G01S 19/25* (2013.01)

(58) Field of Classification Search
CPC ......... G01S 19/24; G01S 19/246; G01S 19/25
USPC ...................................................... 342/357.63
See application file for complete search history.

(56) References Cited

U.S. PATENT DOCUMENTS

| | | | | |
|---|---|---|---|---|
| 6,297,770 B1* | 10/2001 | Ueda | ....................... | G01S 19/05 342/357.62 |
| 6,850,557 B1* | 2/2005 | Gronemeyer | ......... | G01S 19/235 342/357.63 |
| 6,917,331 B2* | 7/2005 | Gronemeyer | ........... | G01S 19/30 342/357.62 |
| 2011/0021171 A1* | 1/2011 | Sturza | ................... | G01S 19/246 455/334 |
| 2013/0041600 A1* | 2/2013 | Rick | ....................... | G01F 1/002 702/50 |
| 2013/0136154 A1* | 5/2013 | Chomal | ............... | H04B 1/7075 375/136 |

* cited by examiner

*Primary Examiner* — Harry Liu
(74) *Attorney, Agent, or Firm* — John R. Pessetto; Charles A. Brill; Frank D. Cimino

(57) ABSTRACT

A method of acquiring a satellite signal in a GNSS receiver includes multiplying a received signal with a hypothesized doppler frequency signal to generate a frequency shifted signal. A PN code sequence signal is multiplied with the frequency shifted signal to generate a PN wiped signal. A windowing function signal is multiplied with the PN wiped signal to generate a windowed signal. The windowed signal is integrated coherently for a first predefined time to generate a coherent accumulated data.

21 Claims, 4 Drawing Sheets

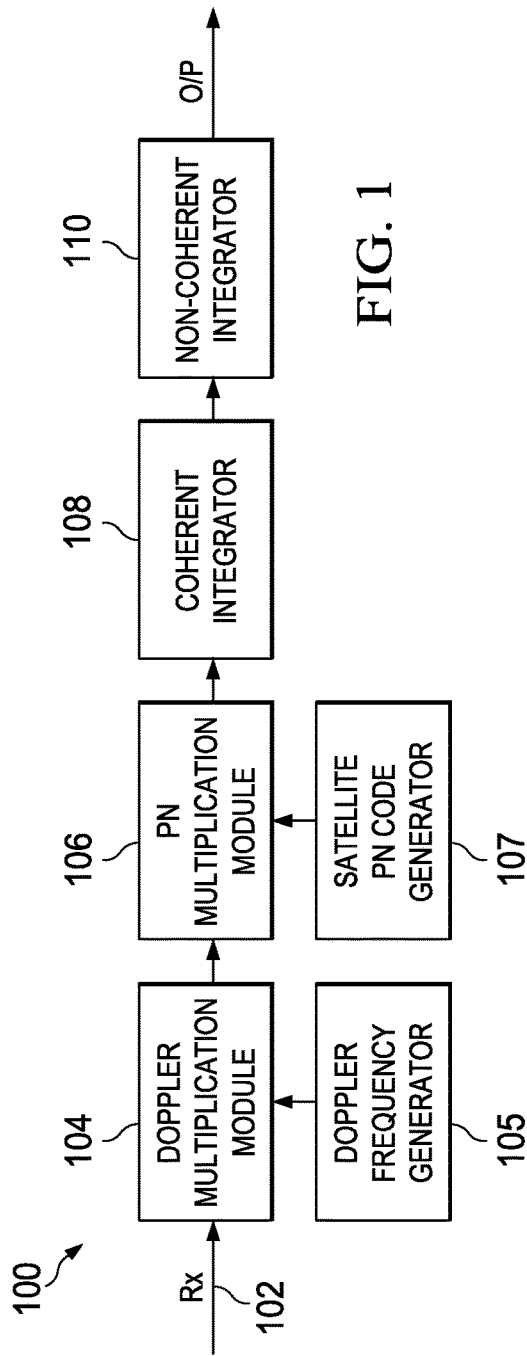
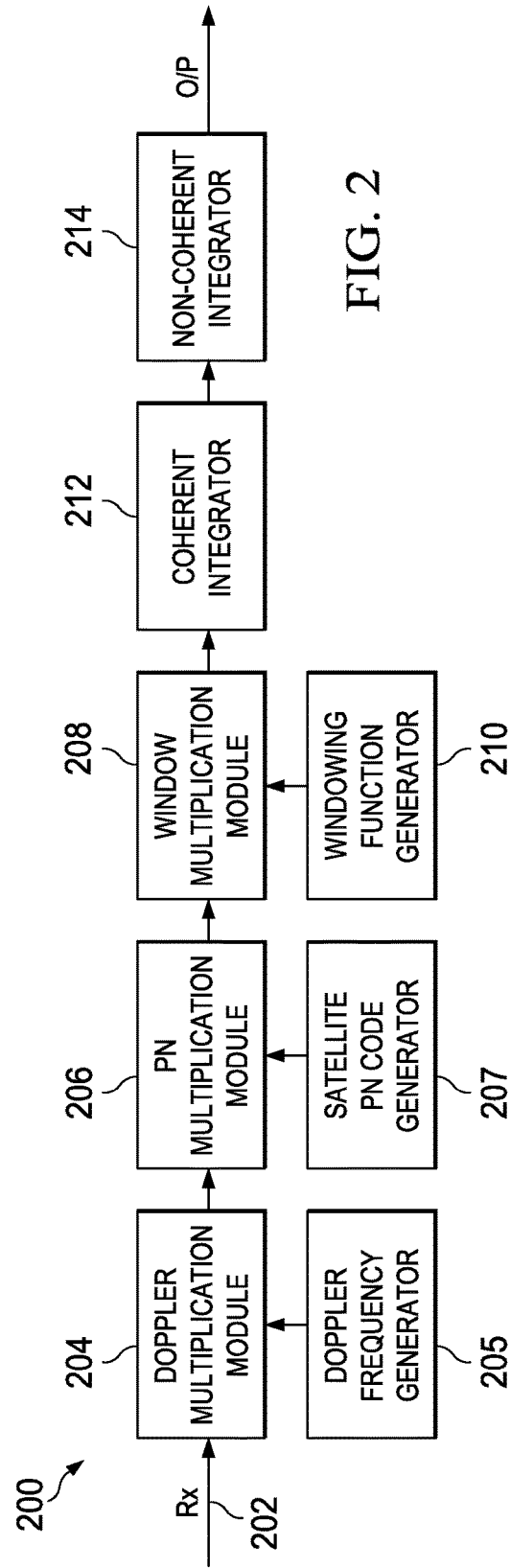

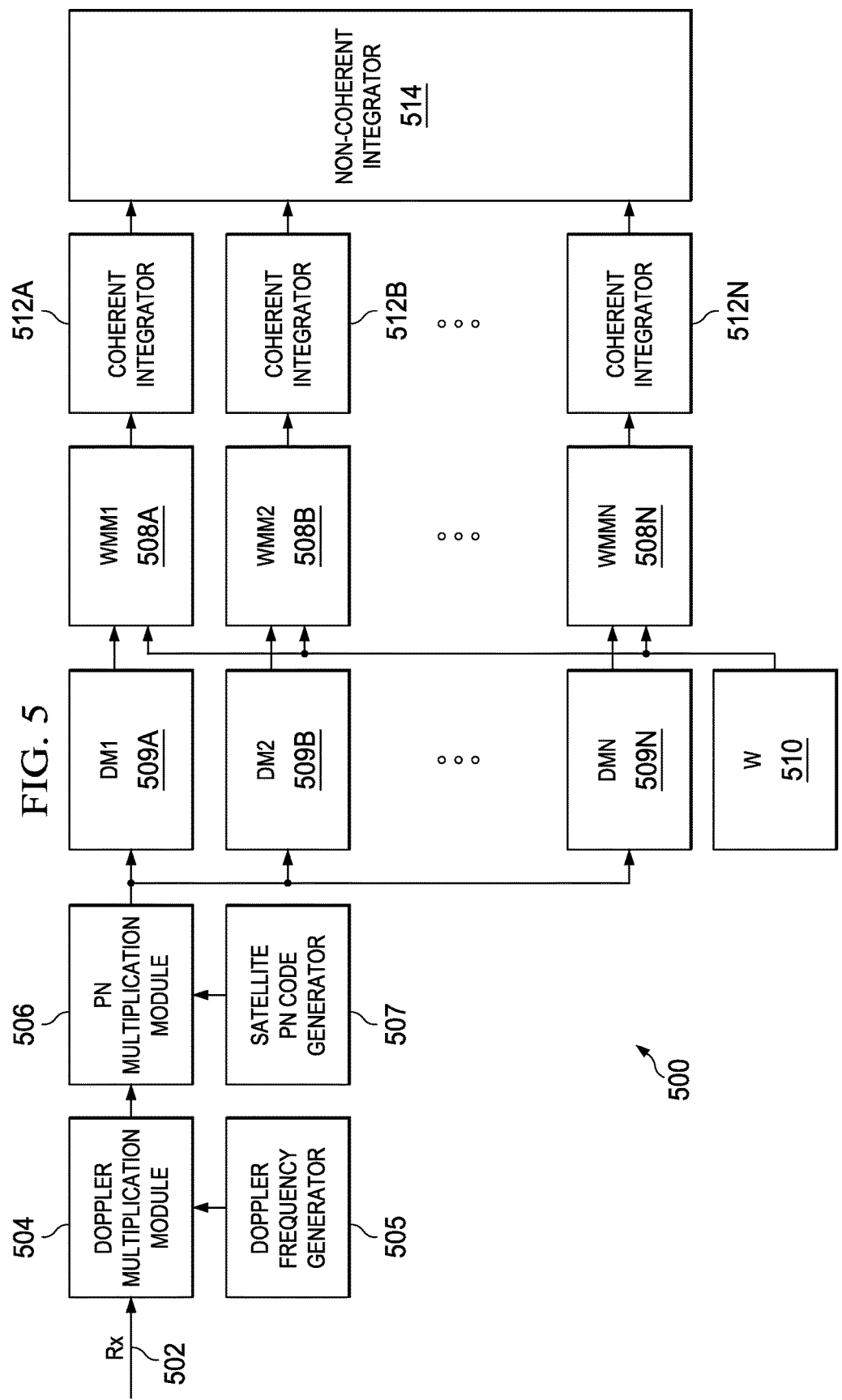

METHOD TO IMPROVE SATELLITE SIGNAL DETECTION

CROSS REFERENCE TO RELATED APPLICATIONS

This application claims priority from India provisional patent application No. 3129/CHE/2013 filed on Jul. 12, 2013 which is hereby incorporated by reference in its entirety.

TECHNICAL FIELD

Embodiments of the disclosure relate to wireless receivers and more particularly to global navigation satellite system (GNSS) receivers.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g., a location, a speed, a direction of travel, etc.).

In GNSS, multiple satellites may be present, with each transmitting a satellite signal. A received signal at a GNSS receiver contains one or more of the transmitted satellite signals. To obtain the information from the respective transmitted signals, the GNSS receiver performs a signal acquisition/tracking procedure. More specifically, the GNSS receiver searches for the corresponding transmitted satellite signals in the received signal and then locks onto them for subsequent tracking of the corresponding satellites to receive the satellite information.

When a GNSS receiver is first turned on, it searches for satellite signals that match known PN (pseudorandom noise) codes. A match of a known PN code and a doppler frequency with a received signal identifies the transmitting satellite. With multiple satellites present in GNSS systems and the length of the PN codes is long, the dimensions of the search space increases the acquisition time spent in acquiring the signal. Fast signal acquisition plays an important role in achieving faster position determination. With the increase in demand for satellite-based positioning, fast signal acquisition will be a limiting factor for achieving lower latencies in determination of user's position and speed.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An example embodiment provides a method of acquiring a satellite signal in a GNSS receiver. A received signal is multiplied with a hypothesized doppler frequency signal to generate a frequency shifted signal. A PN code sequence signal is multiplied with the frequency shifted signal to generate a PN wiped signal. A windowing function signal is multiplied with the PN wiped signal to generate a windowed signal. The windowed signal is integrated coherently for a first predefined time to generate a coherent accumulated data.

Another embodiment provides a method of acquiring a satellite signal in a GNSS receiver. A received signal is multiplied with a hypothesized doppler frequency signal to generate a frequency shifted signal. A PN code sequence signal is multiplied with the frequency shifted signal to generate a PN wiped signal. The PN wiped signal is multiplied with a plurality of delayed windowing function signals to generate a plurality of windowed signals. The plurality of windowed signals is integrated coherently for a first predefined time to generate a plurality of coherent accumulated data.

An embodiment provides a method of acquiring a satellite signal in a GNSS receiver. A received signal is multiplied with a hypothesized doppler frequency signal to generate a frequency shifted signal. A PN code sequence signal is multiplied with the frequency shifted signal to generate a PN wiped signal. The PN wiped signal is delayed by predefined time periods to generate a plurality of delayed PN wiped signals. A windowing function signal is multiplied with the plurality of delayed PN wiped signals to generate a plurality of windowed signals. The plurality of windowed signals is integrated coherently for a first predefined time to generate a plurality of coherent accumulated data.

An example embodiment provides a global navigation satellite system (GNSS) receiver. The GNSS receiver includes a doppler multiplication module. The doppler multiplication module multiplies a received signal with a hypothesized doppler frequency signal to generate a frequency shifted signal. A PN multiplication module multiplies a PN code sequence signal with the frequency shifted signal to generate a PN wiped signal. A window multiplication module multiplies a windowing function signal with the PN wiped signal to generate a windowed signal. A coherent integrator integrates the windowed signal for a first predefined time to generate a coherent accumulated data.

An embodiment provides a global navigation satellite system (GNSS) receiver. The GNSS receiver includes a doppler multiplication module. The doppler multiplication module multiplies a received signal with a hypothesized doppler frequency signal to generate a frequency shifted signal. A PN multiplication module multiplies a PN code sequence signal with the frequency shifted signal to generate a PN wiped signal. A plurality of window multiplication modules multiplies the PN wiped signal with a plurality of delayed windowing function signals to generate a plurality of windowed signals. A plurality of coherent integrator integrates coherently the plurality of windowed signals for a first predefined time to generate a plurality of coherent accumulated data.

An example embodiment provides a global navigation satellite system (GNSS) receiver. The GNSS receiver includes a doppler multiplication module. The doppler multiplication module multiplies a received signal with a hypothesized doppler frequency signal to generate a frequency shifted signal. A PN multiplication module multiplies a PN code sequence signal with the frequency shifted signal to generate a PN wiped signal. A plurality of delay modules delays the PN wiped signal by predefined time periods to generate a plurality of delayed PN wiped signals. A plurality of window multiplication modules multiplies the plurality of delayed PN wiped signals with a windowing function signal to generate a plurality of windowed signals. A plurality of coherent integrator integrates coherently the plurality of windowed signals for a first predefined time to generate a plurality of coherent accumulated data. A non-coherent integrator integrate non-coherentlys the plurality of coherent accumulated data.

Other aspects and example embodiments are provided in the Drawings and the Detailed Description that follows.

BRIEF DESCRIPTION OF THE VIEWS OF DRAWINGS

FIG. 1 illustrates a block diagram of a global navigation satellite system (GNSS) receiver;

FIG. 2 illustrates a block diagram of a global navigation satellite system (GNSS) receiver, according to an embodiment;

FIG. 5 illustrates a block diagram of a global navigation satellite system (GNSS) receiver, according to an embodiment.

DETAILED DESCRIPTION OF THE EMBODIMENTS

Figure 3:
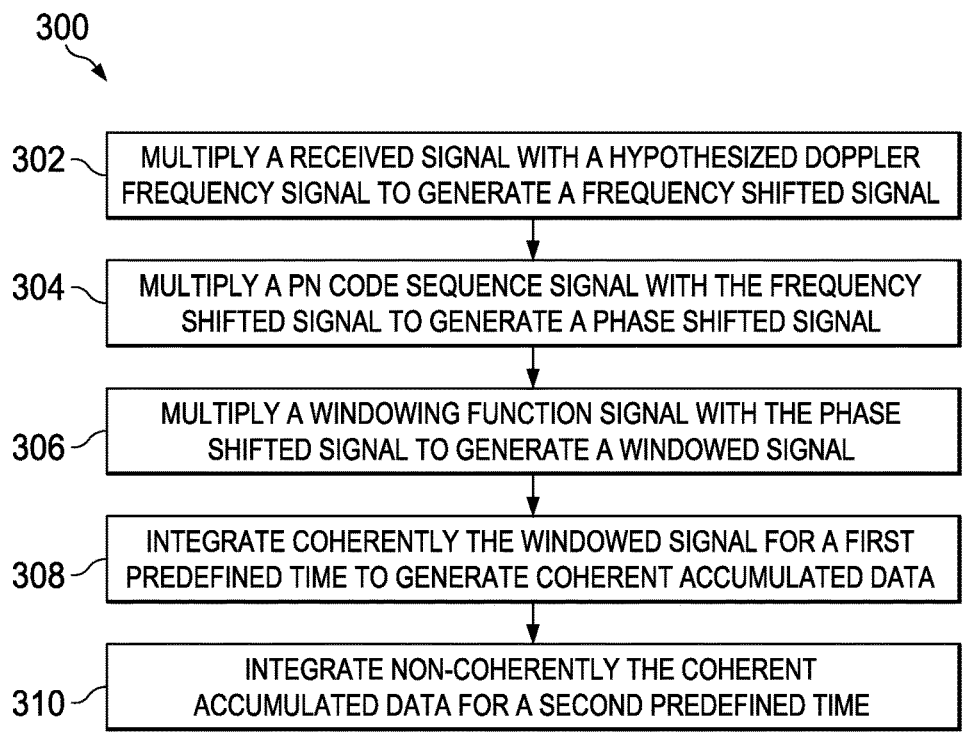
FIG. 3 is a flowchart illustrating a method of acquiring a satellite signal in a GNSS receiver, according to an embodiment.

A received signal (Rx) at a GNSS receiver contains one or more of the transmitted satellite signals. The acquisition of a satellite signal involves a two-dimensional search of carrier frequency and a pseudo-random number (PN) code sequence phase. Each satellite transmits a satellite signal using a unique PN code sequence, which repeats at regular intervals. For example, in one embodiment, a GPS satellite transmits 1023-chip long PN code sequence, which repeats every millisecond. The GNSS receiver locally generates a hypothesized doppler frequency signal to generate a frequency shifted signal. The GNSS receiver also multiplies the received signal (Rx) with a PN code sequence to identify the satellite signal. On detecting, the presence of a satellite signal in the received signal (Rx), the GNSS receiver locks onto the satellite signal for subsequent tracking of the corresponding GNSS satellite to receive satellite information. After locking onto or acquiring a minimum of four GNSS satellites, the GNSS receiver computes a user position by triangulation. The computation of the user position may include one or more operations known to those skilled in the relevant art and is not discussed herein for the sake of brevity of the description.

FIG. 1 illustrates a block diagram of a global navigation satellite system (GNSS) receiver 100. A received signal (Rx) 102 is received at a doppler multiplication module 104 of the GNSS receiver 100. A doppler frequency generator 105 is coupled to the doppler multiplication module 104. A PN multiplication module 106 is coupled to the doppler multiplication module 104. A satellite PN code generator 107 is coupled to the PN multiplication module 106. A coherent integrator 108 receives an output of the PN multiplication module 106 and a non-coherent integrator 110 receives an output of the coherent integrator 108. A GNSS receiver may include one or more additional components known to those skilled in the relevant art and are not discussed here for simplicity of the description.

The operation of the GNSS receiver 100 illustrated in FIG. 1 is now explained. A received signal (Rx) 102 at a GNSS receiver 100 contains one or more of the transmitted satellite signals. Communication systems employing satellites with non-geostationary orbits exhibit a high degree of relative user terminal and satellite motion. The relative motion creates substantial doppler components or shifts in the carrier frequency of signals within the communication links. Because these doppler components vary with user terminal and satellite motion, they create a range of uncertainty in the frequency of the carrier signal, or more simply, doppler frequency. Similar effects may be observed in terrestrial systems where the user terminal is moving at a high speed, such as when used on a high speed train or other vehicle. Therefore, the frequency of a satellite signal in the received signal (Rx) 102 will be different from the actual frequency of the satellite signal because of the relative motion between user terminal and the satellite. The frequency of the satellite signal in the received signal (Rx) 102 is called actual doppler frequency.

The doppler multiplication module 104 multiplies the received signal (Rx) 102 with a hypothesized doppler frequency signal to generate a frequency shifted signal. The doppler frequency generator 105 generates the hypothesized doppler frequency signal from a hypothesized frequency in a predefined frequency range in the GNSS receiver 100. The doppler frequency generator 105 may maintain a table of GNSS satellites and their corresponding frequency ranges. Also, the doppler frequency generator 105 may perform mathematical operations on the hypothesized frequency to compute the hypothesized doppler frequency signal. The PN multiplication module 106 multiplies a PN code sequence signal with the frequency shifted signal from the doppler multiplication module 104 to generate a PN wiped signal. The satellite PN code generator 107 provides a PN code sequence signal to the PN multiplication module 106. The satellite PN code generator 107 may maintain a table of GNSS satellites and their corresponding PN code sequence. Each GNSS satellite transmits a unique PN code sequence. Also, the satellite PN code generator 107 may maintain a table of GNSS satellites and their corresponding PN code sequence and further multiplies the stored PN code sequence with a satellite navigation data bit signal and provides the multiplied signal as the PN code sequence signal to the PN multiplication module 106. The satellite navigation data bit signal may be provided to the GNSS receiver 100 through a processing unit in the GNSS receiver 100 or through network assistance which is one of the following, but not limited to, internet, wired or wireless devices assisting the GNSS receiver 100. The specifically disclosed operations and sequences of multiplications are provided to explain the logical flow of methods and are understood not to limit the scope of the present disclosure. In a unique case, the PN multiplication module 106 receives the received signal (Rx) 102 and performs multiplication operation on the received signal (Rx) 102. The doppler multiplication module 104 performs multiplication on an output of the PN multiplication module 106.

The GNSS receiver 100 accumulates or sums an output of the PN multiplication module 106 across time to build signal peaks thus enabling better detection of weaker satellite signals. The GNSS receiver 100 accumulates an output of the PN multiplication module 106 using the coherent integrator 108 and the non-coherent integrator 110. The coherent integrator 108 integrates the PN wiped signal from the PN multiplication module 106 for a first predefined time to generate coherent accumulated data. The coherent integrator 108 may sum all values of the PN wiped signal in the first predefined time to generate coherent accumulated data. The first predefined time is either defined by a user or is selected for optimum performance of the GNSS receiver 100 or to efficiently detect peaks of a satellite signal. The non-coherent integrator 110 is coupled to the coherent integrator 108. The non-coherent integrator 110 integrates the coherent accumulated data for a second predefined time. The non-coherent integrator may sum absolute values of the coherent accumulated data. The non-coherent integration may include known techniques, such as summing of squares of absolute values of coherent accumulated data from the coherent integrator 108 and the like. The second predefined time is either defined by a user or is selected for optimum performance of the GNSS receiver 100 or to efficiently detect peaks of a satellite signal. The non-coherent integration is performed since phase continuity in coherent integration is lost between successive coherent accumulated data.

An output (O/P) of the non-coherent integrator 110 indicates if a hypothesized frequency corresponds to a satellite signal frequency. The output (O/P) of the non-coherent integrator 110 provides a peak at the hypothesized frequency which indicates presence of a satellite signal. The peak pattern repeats at regular intervals since the PN code in a satellite signal repeats at regular intervals. The hypothesized frequency and PN code sequence for multiple satellite signals are used by a position computation unit (not illustrated in FIG. 1) in GNSS receiver 100 to determine a user's position and velocity. In case, the peaks are not detected at the output (O/P) of the non-coherent integrator 110, the GNSS receiver 100 repeats the process for a different set of hypothesized frequency and PN code sequence. The GNSS receiver 100 processes the received signal with different combinations of hypothesized frequency and PN code sequence to identify a satellite signal. Also, the PN code sequence signal may be cyclically shifted and multiplied with the frequency shifted signal to generate a subsequent PN wiped signal or the frequency shifted signal may be delayed and multiplied with the PN code sequence signal to generate the subsequent PN wiped signal. The subsequent PN wiped signal is further processed in the GNSS receiver 100 to detect presence of a satellite signal. The GNSS receiver 100 is either used to acquire a single satellite signal or used to acquire multiple satellite signals in a serial mode i.e. the GNSS receiver 100 acquires a first satellite signal before starting the process for acquiring a second satellite signal. Multiple GNSS receivers can be used to track multiple satellite signals and each GNSS receiver tracks a single satellite signal. Multiple GNSS receivers are also sometimes used to track a single satellite signal.

The doppler multiplication module 104 multiplies the received signal (Rx) 102 with the hypothesized doppler frequency signal to generate the frequency shifted signal. The doppler frequency generator 105 generates the hypothesized doppler frequency signal from the hypothesized frequency in the predefined frequency range in the GNSS receiver. The hypothesized frequency values generated by the doppler frequency generator 105 are discrete frequencies. However, the actual doppler frequency is in continuous frequency spectrum. Therefore, probability of detection (PoD) of a satellite signal is low when the difference between the actual doppler frequency and hypothesized frequency is more and the probability of detection (PoD) of the satellite signal is high when the difference between the actual doppler frequency and hypothesized frequency is less. The probability of detection (PoD) of a satellite signal is low either when the difference between the actual doppler frequency and hypothesized frequency is more than 200 Hz or when the difference between the actual doppler frequency and hypothesized frequency is more than a predefined value for optimum performance of the GNSS receiver 100. The low PoD results in higher power losses in GNSS receiver 100. Coherent integration also results in power loss when the difference between the actual doppler frequency and hypothesized frequency is high.

FIG. 2 illustrates a block diagram of a global navigation satellite system (GNSS) receiver 200, according to an embodiment. The received signal (Rx) 202 is received at a doppler multiplication module 204 of the GNSS receiver 200. A doppler frequency generator 205 is coupled to the doppler multiplication module 204. A PN multiplication module 206 is coupled to the doppler multiplication module 204. A satellite PN code generator 207 is coupled to the PN multiplication module 206. A window multiplication module 208 is coupled to the PN multiplication module 206. A windowing function generator 210 is coupled to the window multiplication module 208. A coherent integrator 212 receives an output of the window multiplication module 208 and a non-coherent integrator 214 receives an output of the coherent integrator 212. A GNSS receiver may include one or more additional components known to those skilled in the relevant art and are not discussed here for simplicity of the description.

The operation of the GNSS receiver 200 illustrated in FIG. 2 is now explained. A received signal (Rx) 202 at a GNSS receiver 200 contains one or more of the transmitted satellite signals. Communication systems employing satellites with non-geostationary orbits exhibit a high degree of relative user terminal and satellite motion. The relative motion creates fairly substantial doppler components or shifts in the carrier frequency of signals within the communication links. Because these doppler components vary with user terminal and satellite motion, they create a range of uncertainty in the frequency of the carrier signal, or more simply, doppler frequency. Similar effects may be observed in terrestrial systems where the user terminal is moving at a high speed, such as when used on a high speed train or other vehicle. Therefore, the frequency of a satellite signal in the received signal (Rx) 202 will be different from the actual frequency of the satellite signal because of the relative motion between user terminal and the satellite. The frequency of the satellite signal in the received signal (Rx) 202 is called actual doppler frequency.

The doppler multiplication module 204 multiplies the received signal (Rx) 202 with a hypothesized doppler frequency signal to generate a frequency shifted signal. The doppler frequency generator 205 generates the hypothesized doppler frequency signal from a hypothesized frequency in a predefined frequency range in the GNSS receiver 200. In one embodiment, the doppler frequency generator 205 maintains a table of GNSS satellites and their corresponding frequency ranges. In one embodiment, the doppler frequency generator 205 performs mathematical operations on the hypothesized frequency to compute the hypothesized doppler frequency signal. The PN multiplication module 206 multiplies a PN code sequence signal with the frequency shifted signal from the doppler multiplication module 204 to generate a PN wiped signal. The satellite PN code generator 207 provides a PN code sequence signal to the PN multiplication module 206. In one embodiment, the satellite PN code generator 207 maintains a table of GNSS satellites and their corresponding PN code sequence. Each GNSS satellite transmits a unique PN code sequence. In one embodiment, the satellite PN code generator 207 maintains a table of GNSS satellites and their corresponding PN code sequence and further multiplies the stored PN code sequence with a satellite navigation data bit signal and provides the multiplied signal as the PN code sequence signal to the PN multiplication module 206. The satellite navigation data bit signal may be provided to the GNSS receiver 200 through a processing unit in the GNSS receiver 200 or through network assistance which is one of the following, but not limited to, internet, wired or wireless devices assisting the GNSS receiver 200. The window multiplication module 208 multiplies a windowing function signal with the PN wiped signal to generate a windowed signal. The window multiplication module 208 provides a windowed signal as an output to the coherent integrator 212. The windowing function generator 210 generates the windowing function signal. In one embodiment, the windowing function generator 210 generates multiple windowing function signals. The windowing function signal may include, but is not limited to, a sinc window, a Power of cosine window, a Hamming window, a Bartlet window, a Kaiser window, a Tukey window, a Gaussian window, a Triangular window, a Hann window, a Welch window, a Parzen window, a Blackman window, a Flat Top window and the like. The window multiplication module 208 provides uniformly high probability of acquiring a satellite signal irrespective of the actual doppler frequency offset from the hypothesized frequency. The specifically disclosed operations and sequences of multiplications are provided to explain the logical flow of methods and are understood not to limit the scope of the present disclosure. In an embodiment, the PN multiplication module 206 receives the received signal (Rx) 202 and performs multiplication operation on the received signal (Rx) 202. The doppler multiplication module 204 performs multiplication on an output of the PN multiplication module 206. In an embodiment, the order of multiplication by the doppler multiplication module 204, the PN multiplication module 206 and the window multiplication module 208 varies to achieve optimum performance of GNSS receiver 200. In an embodiment, a processing block multiplies the received signal (Rx) 202, the hypothesized doppler frequency signal, the PN code sequence signal, and the windowing function signal to generate a windowed signal.

The GNSS receiver 200 accumulates or sums an output of the window multiplication module 208 across regular intervals to build signal peaks thus enabling better detection of weaker satellite signals. The GNSS receiver 200 accumulates an output of the window multiplication module 208 using the coherent integrator 212 and the non-coherent integrator 214. The coherent integrator 212 integrates the windowed signal from the window multiplication module 208 for a first predefined time to generate coherent accumulated data. In one embodiment, the coherent integrator 212 sums all values of the windowed signal in the first predefined time to generate coherent accumulated data. In an embodiment, the first predefined time is defined by a user. In another embodiment, the first predefined time is selected for optimum performance of the GNSS receiver 200 or to efficiently detect peaks of a satellite signal. The non-coherent integrator 214 is coupled to the coherent integrator 212. The non-coherent integrator 214 integrates the coherent accumulated data for a second predefined time. In one embodiment, the non-coherent integrator sums absolute values of the coherent accumulated data. In one embodiment, the non-coherent integration may include known techniques, such as summing of squares of absolute values of coherent accumulated data from the coherent integrator 212 and the like. In an embodiment, the second predefined time is defined by a user. In another embodiment, the second predefined time is selected for optimum performance of the GNSS receiver 200 or to efficiently detect peaks of a satellite signal. The non-coherent integration is performed since phase continuity in coherent integration is lost between successive coherent accumulated data.

An output (O/P) of the non-coherent integrator 214 indicates if a hypothesized frequency corresponds to a satellite signal frequency. The output (O/P) of the non-coherent integrator 214 provides a peak at the hypothesized frequency which indicates presence of a satellite signal. The peak pattern repeats at regular intervals since the PN code in a satellite signal repeats at regular intervals. The hypothesized frequency and PN code sequence for multiple satellite signals are used by a position computation unit (not illustrated in FIG. 2) in GNSS receiver 200 to determine a user's position and velocity. In case, the peaks are not detected at the output (O/P) of the non-coherent integrator 214, the GNSS receiver 200 repeats the process for a different set of hypothesized frequency and PN code sequence. The GNSS receiver 200 processes the received signal with different combinations of hypothesized frequency and PN code sequence to identify a satellite signal. In one embodiment, the PN code sequence signal is cyclically shifted and multiplied with the frequency shifted signal to generate a subsequent PN wiped signal. In another embodiment, the frequency shifted signal is delayed to generate a delayed frequency shifted signal and multiplied with the PN code sequence signal to generate the subsequent PN wiped signal. The subsequent PN wiped signal is further processed in the GNSS receiver 200 to detect presence of a satellite signal. In one embodiment, the windowing function signal is delayed to generate a delayed windowing function signal and the PN wiped signal is multiplied with the delayed windowing function signal to generate a subsequent windowed signal. In another embodiment, the PN wiped signal is delayed to generate a delayed PN wiped signal and the delayed PN wiped signal is multiplied with the windowing function signal to generate the subsequent windowed signal. The subsequent windowed signal is further processed in the GNSS receiver 200 to detect presence of a satellite signal. The processing includes integrating, coherently, the subsequent windowed signals to generate a coherent accumulated data and then integrating, non-coherently, the coherent accumulated data. The processing may also include accumulating the sum over a time duration to improve detection and position computation performance. In an embodiment, non-coherent integration is summing absolute values of the coherent accumulated data. In an embodiment, non-coherent integration is summing squares of the absolute values of the coherent accumulated data.

In one embodiment, the GNSS receiver 200 is used to acquire a single satellite signal. In another embodiment, the GNSS receiver 200 is used to acquire multiple satellite signals in a serial mode i.e. the GNSS receiver 200 acquires a first satellite signal before starting the process for acquiring a second satellite signal. In an embodiment, multiple GNSS receivers are used to track multiple satellite signals and each GNSS receiver tracks a single satellite signal. In another embodiment, multiple GNSS receivers are used to track a single satellite signal.

The window multiplication module 208 in GNSS receiver 200 multiplies the windowing function signal with the PN wiped signal to generate the windowed signal. The window multiplication module 208 provides the windowed signal as an output to the coherent integrator 212. The window multiplication module 208 provides uniform probability of acquiring a satellite signal irrespective of the actual doppler frequency offset from the hypothesized frequency. This increases the sensitivity of GNSS receiver 200 as the acquisition time of a satellite signal is reduced. The probability of detection (PoD) of a satellite signal is uniformly high irrespective of the difference between the actual doppler frequency and the hypothesized frequency. The uniform and high PoD results in quicker detection of satellite signals and their parameters.

The flowchart diagram that follows is generally set forth as logical flowchart diagram. The depicted operations and sequences thereof are indicative of at least one embodiment of the present disclosure. It should be appreciated, however, that the scope of the present disclosure includes methods that use other operations and sequences, and methods that are useful or similar in function, logic, or effect.

FIG. 3 is a flowchart 300 illustrating a method of acquiring a satellite signal in a GNSS receiver, according to an embodiment. A received signal (Rx) 202 at a GNSS receiver 200, as illustrated in FIG. 2, contains one or more of the transmitted satellite signals. At step 302, the received signal is multiplied with a hypothesized doppler frequency signal to generate a frequency shifted signal. A doppler frequency generator, generates the hypothesized doppler frequency signal from a hypothesized frequency in a predefined frequency range in the GNSS receiver 200. In one embodiment, the doppler frequency generator performs mathematical operations on the hypothesized frequency to compute the hypothesized doppler frequency signal. A PN code sequence signal is multiplied with the frequency shifted signal to generate a PN wiped signal at step 304. A satellite PN code generator generates the PN code sequence signal. In one embodiment, the satellite PN code generator maintains a table of GNSS satellites and their corresponding PN code sequence. Each GNSS satellite transmits a unique PN code sequence. In one embodiment, the satellite PN code generator maintains a table of GNSS satellites and their corresponding PN code sequence and further multiplies the stored PN code sequence with a satellite navigation data bit signal and provides the multiplied signal as the PN code sequence signal for use in step 304. The satellite navigation data bit signal may be provided to the GNSS receiver 200 through a processing unit in the GNSS receiver 200 or through network assistance which is one of the following, but not limited to, internet, wired or wireless devices assisting the GNSS receiver 200. At step 306, a windowing function signal is multiplied with the PN wiped signal to generate a windowed signal. This multiplication provides uniform probability of acquiring a satellite signal irrespective of an actual doppler frequency offset from the hypothesized frequency. The frequency of a satellite signal in the received signal (Rx) 202 will be different from the actual frequency of the satellite signal because of the relative motion between user terminal and the satellite. The frequency of the satellite signal in the received signal (Rx) 202 is called actual doppler frequency. The windowed signal is integrated coherently for a first predefined time to generate coherent accumulated data at step 308. Coherent integration is summing the windowed signal across regular intervals to build signal peaks thus enabling better detection of satellite signals. The coherent accumulated data is integrated non-coherently for a second predefined time at step 310. In one embodiment, the non-coherent integration is summing absolute values of the coherent accumulated data. The non-coherent integration is performed since phase continuity in coherent integration is lost between successive coherent accumulated data.

Figure 4:
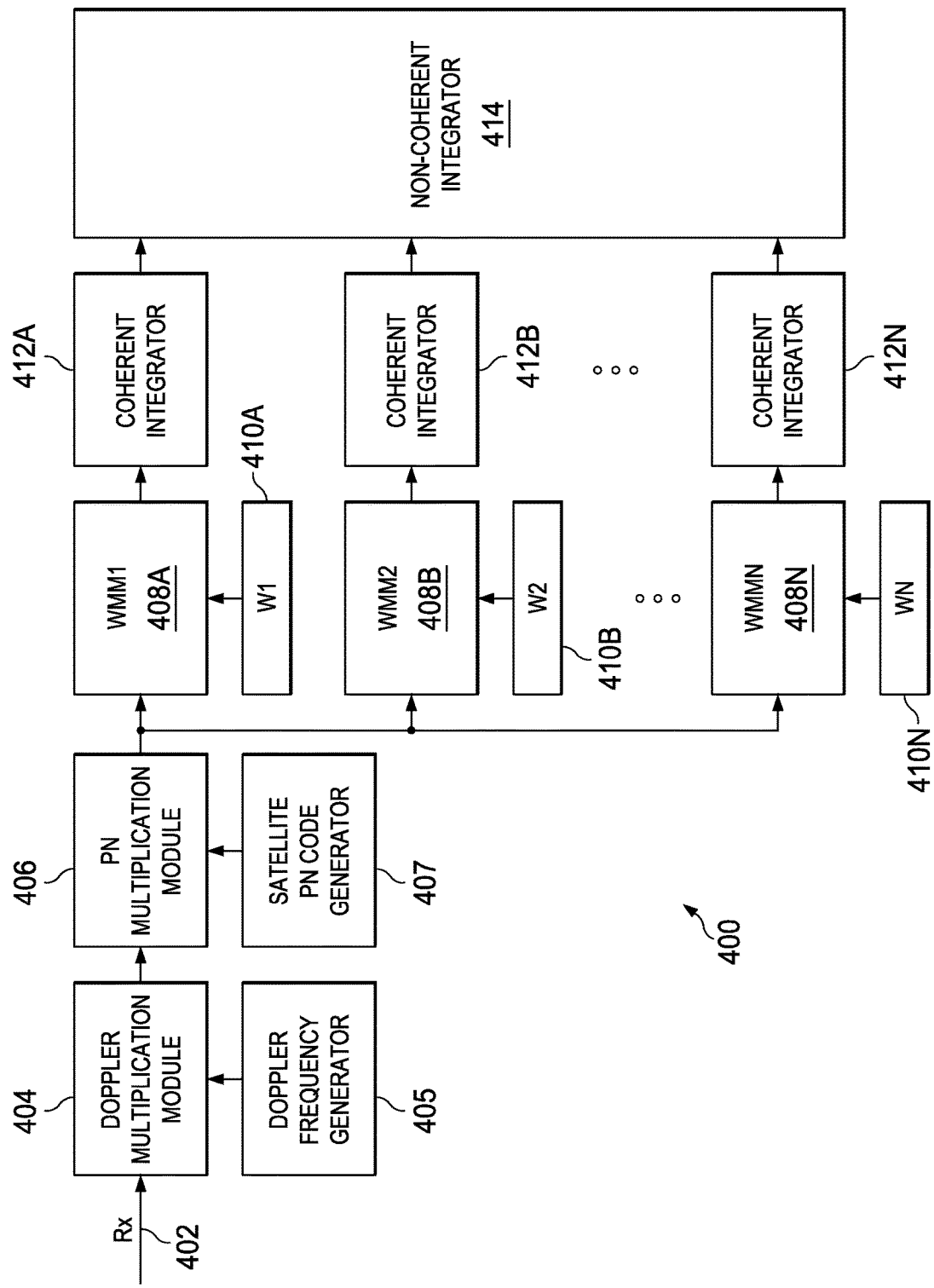
FIG. 4 illustrates a block diagram of a global navigation satellite system (GNSS) receiver, according to an embodiment.

FIG. 4 illustrates a block diagram of a global navigation satellite system (GNSS) receiver 400, according to an embodiment. The received signal (Rx) 402 is received at a doppler multiplication module 404 of the GNSS receiver 400. A doppler frequency generator 405 is coupled to the doppler multiplication module 404. A PN multiplication module 406 is coupled to the doppler multiplication module 404. A satellite PN code generator 407 is coupled to the PN multiplication module 406. A plurality of window multiplication modules WMM1 (408A), WMM2 (408B) and WMMN (408N) are coupled to the PN multiplication module 406. The window multiplication module WMMN (408N) is $N^{th}$ module, where N is an integer. A plurality of windowing function generators W1 (410A), W2 (410B) and WN (410N) are coupled to plurality of window multiplication modules WMM1 (408A), WMM2 (408B) and WMMN (408N) respectively. The windowing function generator WN (410N) is $N^{th}$ generator, where N is an integer. Each windowing function generator is coupled to a single window multiplication module. For example, windowing function generator W1 (410A) is coupled to the window multiplication module WMM1 (408A) and windowing function generator WN (410N) is coupled to the window multiplication module WMMN (408N). A plurality of coherent integrators 412A, 412B and 412N receives an output of the plurality of window multiplication modules WMM1 (408A), WMM2 (408B) and WMMN (408N) respectively. For example, a coherent integrator 412A is coupled to the window multiplication module WMM1 (408A) and a coherent integrator 412N is coupled to the window multiplication module WMMN (408N). A non-coherent integrator 414 receives an output of the plurality of coherent integrators 412A, 412B and 412N. A GNSS receiver may include one or more additional components known to those skilled in the relevant art and are not discussed here for simplicity of the description.

The operation of the GNSS receiver 400 illustrated in FIG. 4 is now explained. A received signal (Rx) 402 at a GNSS receiver 400 contains one or more of the transmitted satellite signals. Communication systems employing satellites with non-geostationary orbits exhibit a high degree of relative user terminal and satellite motion. The relative motion creates fairly substantial doppler components or shifts in the carrier frequency of signals within the communication links. Because these doppler components vary with user terminal and satellite motion, they create a range of uncertainty in the frequency of the carrier signal, or more simply, doppler frequency. Similar effects may be observed in terrestrial systems where the user terminal is moving at a high speed, such as when used on a high speed train or other vehicle. Therefore, the frequency of a satellite signal in the received signal (Rx) 402 will be different from the actual frequency of the satellite signal because of the relative motion between user terminal and the satellite. The frequency of the satellite signal in the received signal (Rx) 402 is called actual doppler frequency.

The doppler multiplication module 404 multiplies the received signal (Rx) 402 with a hypothesized doppler frequency signal to generate a frequency shifted signal. The doppler frequency generator 405 generates the hypothesized doppler frequency signal from a hypothesized frequency in a predefined frequency range in the GNSS receiver 400. In one embodiment, the doppler frequency generator 405 maintains a table of GNSS satellites and their corresponding frequency ranges. In one embodiment, the doppler frequency generator 405 performs mathematical operations on the hypothesized frequency to compute the hypothesized doppler frequency signal. The PN multiplication module 406 multiplies a PN code sequence signal with the frequency shifted signal from the doppler multiplication module 404 to generate a PN wiped signal. The satellite PN code generator 407 provides a PN code sequence signal to the PN multiplication module 406. In one embodiment, the satellite PN code generator 407 maintains a table of GNSS satellites and their corresponding PN code sequence. Each GNSS satellite transmits a unique PN code sequence. In one embodiment, the satellite PN code generator 407 maintains a table of GNSS satellites and their corresponding PN code sequence and further multiplies the stored PN code sequence with a satellite navigation data bit signal and provides the multiplied signal as the PN code sequence signal to the PN multiplication module 406. The satellite navigation data bit signal may be provided to the GNSS receiver 400 through a processing unit in the GNSS receiver 400 or through network assistance which is one of the following, but not limited to, internet, wired or wireless devices assisting the GNSS receiver 400. The PN wiped signal from the PN multiplication module 406 is provided to the plurality of window multiplication modules WMM1 (408A), WMM2 (408B) and WMMN (408N). The plurality of windowing function generators W1 (410A), W2 (410B) and WN (410N) generate a plurality of delayed windowing function signals by delaying a windowing function signal by predefined time intervals. The windowing function signal may include, but is not limited to, a sinc window, a Power of cosine window, a Hamming window, a Bartlett window, a Kaiser window, a Tukey window, a Gaussian window, a Triangular window, a Hann window, a Welch window, a Parzen window, a Blackman window, a Flat Top window and the like. In one embodiment, a sinc window is used as a windowing function. The plurality of windowing function generators W1 (410A), W2 (410B) and WN (410N) would generate a plurality of delayed sinc functions such as sinc (t), sinc $(t-t_0)$; sinc $(t-2t_0)$ and the like, where t represents time and $t_0$ and $2t_0$ etc. represents predefined time periods. The predefined time periods $t_0$, $2t_0$ etc. are less than duration of the windowing function signal. The minimum positive difference between the time periods of the plurality of delayed windowing function signals is less than the duration of the windowing function signal. In one embodiment, different time periods are used by the plurality of windowing function generators. For example, they would be sinc (t), sinc $(t-t_0)$, sinc $(t-t_1)$, sinc $(t-t_2)$ and the like, where t represents time and $t_0$, $t_1$ and $t_2$ etc represent predefined time periods. The PN wiped signal from the PN multiplication module 406 is multiplied with the plurality of delayed windowing function signals to generate a plurality of windowed signals The functioning of window multiplication modules WMM1 (408A) and coherent integrator 412A is now explained. It is understood that other window multiplication modules and coherent integrators will operate in a similar manner.

The window multiplication module WMM1 (408A) multiplies a windowing function signal with the PN wiped signal to generate a windowed signal. The window multiplication module WMM1 (408A) provides a windowed signal as an output to the coherent integrator 412A. The windowing function generator W1 (410A) generates the windowing function signal. In one embodiment, the windowing function generator W1 (410A) generates delayed windowing function signal by delaying a windowing function signal. The window multiplication module WMM1 (408A) provides uniform probability of acquiring a satellite signal irrespective of the actual doppler frequency offset from the hypothesized frequency. The specifically disclosed operations and sequences of multiplications are provided to explain the logical flow of methods and are understood not to limit the scope of the present disclosure. In an embodiment, the PN multiplication module 406 receives the received signal (Rx) 402 and performs multiplication operation on the received signal (Rx) 402. The doppler multiplication module 404 performs multiplication on an output of the PN multiplication module 406. In an embodiment, the order of multiplication by the doppler multiplication module 404, the PN multiplication module 406 and the plurality of window multiplication modules WMM1 (408A), WMM2 (408B) and WMMN (408N) varies to achieve optimum performance of GNSS receiver 400. In an embodiment, a processing block multiplies the received signal (Rx) 402, the hypothesized doppler frequency signal, the PN code sequence signal, and the plurality of delayed windowing function signals to generate a plurality of windowed signal.

The GNSS receiver 400 accumulates or sums an output of the window multiplication module WMM1 (408A) across time to build signal peaks thus enabling better detection of satellite signals. The GNSS receiver 400 accumulates an output of the window multiplication module WMM1 (408A) using the coherent integrator 412A. The plurality of coherent integrators 412A, 412B and 412N integrates the plurality of windowed signals for a first predefined time to generate a plurality of coherent accumulated data. For example, the coherent integrator 412A integrates a windowed signal from the window multiplication module WMM1 (408A) for a first predefined time to generate a first coherent accumulated data. Similarly, the coherent integrator 412N integrates a windowed signal from the window multiplication module WMMN (408N) for the first predefined time to generate a second coherent accumulated data. In one embodiment, the coherent integrator 412A sums all values of the windowed signal in the first predefined time to generate coherent accumulated data. In an embodiment, the first predefined time is defined by a user. In another embodiment, the first predefined time is selected for optimum performance of the GNSS receiver 400 or to efficiently detect peaks of a satellite signal. The non-coherent integrator 414 is coupled to the plurality of coherent integrators 412A, 412B and 412N. The non-coherent integrator 414 integrates non-coherently the plurality of coherent accumulated data for a second predefined time. In one embodiment, the non-coherent integration includes non-coherently summing the plurality of coherent accumulated data to form a sum, and accumulating the sum for a second predefined time. The non-coherently summing up a plurality of data may be implemented by summing up the absolute values of the plurality of data to form a sum. In an embodiment, non-coherently summing up a plurality of data may be implemented by summing up the squares of the absolute values of the plurality of data to form a sum. In one embodiment, non-coherent integration includes summing absolute values of the plurality of coherent accumulated data. In one embodiment, the non-coherent integration may include techniques, such as summing squares of absolute values of coherent accumulated data and accumulating the sum, and the like. In an embodiment, the second predefined time is defined by a user. In another embodiment, the second predefined time is selected for optimum performance of the GNSS receiver 400 or to efficiently detect peaks of a satellite signal. The non-coherent integration is performed since phase continuity in coherent integration is lost between successive coherent accumulated data.

An output (O/P) of the non-coherent integrator 414 indicates if a hypothesized frequency corresponds to a satellite signal frequency. The output (O/P) of the non-coherent integrator 414 provides a peak at the hypothesized frequency which indicates presence of a satellite signal. The peak pattern repeats at regular intervals since the PN code in a satellite signal repeats at regular intervals. The hypothesized frequency and PN code sequence for multiple satellite signals are used by a position computation unit (not illustrated in FIG. 4) in GNSS receiver 400 to determine a user's position and velocity. In case, the peaks are not detected at the output (O/P) of the non-coherent integrator 414, the GNSS receiver 400 repeats the process for a different set of hypothesized frequency and PN code sequence. The GNSS receiver 400 processes the received signal with different combinations of hypothesized frequency and PN code sequence to identify a satellite signal.

In one embodiment, the PN code sequence signal is cyclically shifted and multiplied with the frequency shifted signal to generate a subsequent PN wiped signal. In another embodiment, the frequency shifted signal is delayed to generate a delayed frequency shifted signal and multiplied with the PN code sequence signal to generate the subsequent PN wiped signal. The subsequent PN wiped signal is further processed in the GNSS receiver 400 to detect presence of a satellite signal and its parameters. In one embodiment, the GNSS receiver 400 is used to acquire a single satellite signal. In another embodiment, the GNSS receiver 400 is used to acquire multiple satellite signals in a serial mode i.e. the GNSS receiver 400 acquires a first satellite signal before starting the process for acquiring a second satellite signal. In an embodiment, multiple GNSS receivers are used to track multiple satellite signals and each GNSS receiver tracks a single satellite signal. In another embodiment, multiple GNSS receivers are used to track a single satellite signal.

The PN wiped signal from the PN multiplication module 406 is multiplied with the plurality of delayed windowing function signals to generate the plurality of windowed signals. The integration of the plurality of windowed signals provides uniform probability of acquiring a satellite signal irrespective of the actual doppler frequency offset from the hypothesized frequency. This increases the sensitivity of GNSS receiver 400 as the acquisition time of a satellite signal is reduced. The probability of detection (PoD) of a satellite signal is uniformly high irrespective of the difference between the actual doppler frequency and the hypothesized frequency. The uniformly high PoD results in quicker detection of satellite signals by the GNSS receiver 400.

FIG. 5 illustrates a block diagram of a global navigation satellite system (GNSS) receiver 500, according to an embodiment. The received signal (Rx) 502 is received at a doppler multiplication module 504 of the GNSS receiver 500. A doppler frequency generator 504 is coupled to the doppler multiplication module 504. A PN multiplication module 506 is coupled to the doppler multiplication module 504. A satellite PN code generator 507 is coupled to the PN multiplication module 506. A plurality of delay modules DM1 (509A), DM2 (509B) and DMN (509N) are coupled to the PN multiplication module 506. The delay module DMN (509N) is $N^{th}$ module, where N is an integer. A plurality of window multiplication modules WMM1 (508A), WMM2 (508B) and WMMN (508N) are coupled to the plurality of delay modules DM1 (509A), DM2 (509B) and DMN (509N) respectively. The window multiplication module WMMN (508N) is $N^{th}$ module, where N is an integer. A windowing function generator W (510) is coupled to the plurality of window multiplication modules WMM1 (508A), WMM2 (508B) and WMMN (508N) respectively. A plurality of coherent integrators 512A, 512B and 512N receives an output of the plurality of window multiplication modules WMM1 (508A), WMM2 (508B) and WMMN (508N) respectively. For example, a coherent integrator 512A is coupled to the window multiplication module WMM1 (508A) and a coherent integrator 512N is coupled to the window multiplication module WMMN (508N). A non-coherent integrator 514 receives an output of the plurality of coherent integrators 512A, 512B and 512N. A GNSS receiver may include one or more additional components known to those skilled in the relevant art and are not discussed here for simplicity of the description.

The operation of the GNSS receiver 500 illustrated in FIG. 5 is now explained. A received signal (Rx) 502 at a GNSS receiver 500 contains one or more of the transmitted satellite signals. Communication systems employing satellites with non-geostationary orbits exhibit a high degree of relative user terminal and satellite motion. The relative motion creates fairly substantial doppler components or shifts in the carrier frequency of signals within the communication links. Because these doppler components vary with user terminal and satellite motion, they create a range of uncertainty in the frequency of the carrier signal, or more simply, doppler frequency. Similar effects may be observed in terrestrial systems where the user terminal is moving at a high speed, such as when used on a high speed train or other vehicle. Therefore, the frequency of a satellite signal in the received signal (Rx) 502 will be different from the actual frequency of the satellite signal because of the relative motion between user terminal and the satellite. The frequency of the satellite signal in the received signal (Rx) 502 is called actual doppler frequency.

The doppler multiplication module 504 multiplies the received signal (Rx) 502 with a hypothesized doppler frequency signal to generate a frequency shifted signal. The doppler frequency generator 504 generates the hypothesized doppler frequency signal from a hypothesized frequency in a predefined frequency range in the GNSS receiver 500. In one embodiment, the doppler frequency generator 504 maintains a table of GNSS satellites and their corresponding frequency ranges. In one embodiment, the doppler frequency generator 504 performs mathematical operations on the hypothesized frequency to compute the hypothesized doppler frequency signal. The PN multiplication module 506 multiplies a PN code sequence signal with the frequency shifted signal from the doppler multiplication module 504 to generate a PN wiped signal. The satellite PN code generator 507 provides a PN code sequence signal to the PN multiplication module 506. In one embodiment, the satellite PN code generator 507 maintains a table of GNSS satellites and their corresponding PN code sequence. Each GNSS satellite transmits a unique PN code sequence. In one embodiment, the satellite PN code generator 507 maintains a table of GNSS satellites and their corresponding PN code sequence and further multiplies the stored PN code sequence with a satellite navigation data bit signal and provides the multiplied signal as the PN code sequence signal to the PN multiplication module 506. The satellite navigation data bit signal may be provided to the GNSS receiver 500 through a processing unit in the GNSS receiver 500 or through network assistance which is one of the following, but not limited to, internet, wired or wireless devices assisting the GNSS receiver 500. The PN wiped signal from the PN multiplication module 506 is provided to the plurality of delay modules DM1 (509A), DM2 (509B) and DMN (509N). The delay modules DM1 (509A), DM2 (509B) and DMN (509N) delay the PN wiped signal by predefined time periods to generate a plurality of delayed PN wiped signals. In one embodiment, the predefined time periods of $t_1$, $t_2$ and $t_N$ is used by delay modules DM1 (509A), DM2 (509B) and DMN (509N) to generate a plurality of delayed PN wiped signals. The windowing function generator W (510) generates a windowing function signal and the windowing function signal is provided to the plurality of window multiplication modules WMM1 (508A), WMM2 (508B) and WMMN (508N). In an embodiment, the predefined time periods are less than the duration of the windowing function signal. In an embodiment, the minimum positive difference between the predefined time periods ($t_1$, $t_2$ and $t_N$) is less than the duration of the windowing function signal.

The windowing function signal may include, but is not limited to, a sinc window, a Power of cosine window, a Hamming window, a Bartlet window, a Kaiser window, a Tukey window, a Gaussian window, a Triangular window, a Hann window, a Welch window, a Parzen window, a Blackman window, a Flat Top window and the like. The plurality of delayed PN wiped signals are multiplied with the windowing function signal to generate a plurality of windowed signals The functioning of window multiplication modules WMM1 (508A) and coherent integrator 512A is now explained. It is understood that other window multiplication modules and coherent integrators will operate in a similar manner.

The window multiplication module WMM1 (508A) multiplies a windowing function signal with the delayed PN wiped signal from the delay module DM1 (509A) to generate a windowed signal. The window multiplication module WMM1 (508A) provides a windowed signal as an output to the coherent integrator 512A. The windowing function generator W (510) generates the windowing function signal. The window multiplication module WMM1 (508A) provides uniform probability of acquiring a satellite signal irrespective of the actual doppler frequency offset from the hypothesized frequency. The specifically disclosed operations and sequences of multiplications are provided to explain the logical flow of methods and are understood not to limit the scope of the present disclosure. In an embodiment, the PN multiplication module 506 receives the received signal (Rx) 502 and performs multiplication operation on the received signal (Rx) 502. The doppler multiplication module 504 performs multiplication on an output of the PN multiplication module 506. In an embodiment, the order of multiplication by the doppler multiplication module 504, the PN multiplication module 506 and the plurality of window multiplication modules WMM1 (508A), WMM2 (508B) and WMMN (508N) varies to achieve optimum performance of GNSS receiver 500. In an embodiment, a processing block multiplies the received signal (Rx) 502, the hypothesized doppler frequency signal, the plurality of delayed PN code sequence signal, and the windowing function signal to generate a plurality of windowed signals.

The GNSS receiver 500 accumulates or sums an output of the window multiplication module WMM1 (508A) across time to build signal peaks thus enabling better detection of satellite signals. The GNSS receiver 500 accumulates an output of the window multiplication module WMM1 (508A) using the coherent integrator 512A. The plurality of coherent integrators 512A, 512B and 512N integrates the plurality of windowed signals for a first predefined time to generate a plurality of coherent accumulated data. For example, the coherent integrator 512A integrates a windowed signal from the window multiplication module WMM1 (508A) for a first predefined time to generate a first coherent accumulated data. Similarly, the coherent integrator 512N integrates a windowed signal from the window multiplication module WMMN (508N) for the first predefined time to generate a second coherent accumulated data. In one embodiment, the coherent integrator 512A sums values of the windowed signal in the first predefined time to generate coherent accumulated data. In an embodiment, the first predefined time is defined by a user. In another embodiment, the first predefined time is selected for optimum performance of the GNSS receiver 500 or to efficiently detect peaks of a satellite signal. The non-coherent integrator 514 is coupled to the plurality of coherent integrators 512A, 512B and 512N. The non-coherent integrator 514 integrates non-coherently the plurality of coherent accumulated data for a second predefined time. In one embodiment, the non-coherent integration includes non-coherently summing the plurality of coherent accumulated data to form a sum, and accumulating the sum for a second predefined time. The non-coherently summing up a plurality of data may be implemented by summing up the absolute values of the plurality of data to form a sum. In an embodiment, non-coherently summing up a plurality of data may be implemented by summing up the squares of the absolute values of the plurality of data to form a sum. In one embodiment, non-coherent integration includes summing absolute values of the plurality of coherent accumulated data. In one embodiment, the non-coherent integration may include techniques, such as summing squares of absolute values of coherent accumulated data and accumulating the sum, and the like. In an embodiment, the second predefined time is defined by a user. In another embodiment, the second predefined time is selected for optimum performance of the GNSS receiver 500 or to efficiently detect peaks of a satellite signal. The non-coherent integration is performed since phase continuity in coherent integration is lost between successive coherent accumulated data.

An output (O/P) of the non-coherent integrator 514 indicates if a hypothesized frequency corresponds to a satellite signal frequency. The output (O/P) of the non-coherent integrator 514 provides a peak at the hypothesized frequency which indicates presence of a satellite signal. The peak pattern repeats at regular intervals since the PN code in a satellite signal repeats at regular intervals. The hypothesized frequency and PN code sequence for multiple satellite signals are used by a position computation unit (not illustrated in FIG. 5) in GNSS receiver 500 to determine a user's position and velocity. In case, the peaks are not detected at the output (O/P) of the non-coherent integrator 514, the GNSS receiver 500 repeats the process for a different set of hypothesized frequency and PN code sequence. The GNSS receiver 500 processes the received signal with different combinations of hypothesized frequency and PN code sequence to identify a satellite signal.

In one embodiment, the PN code sequence signal is cyclically shifted and multiplied with the frequency shifted signal to generate a subsequent PN wiped signal. In another embodiment, the frequency shifted signal is delayed to generate a delayed frequency shifted signal and multiplied with the PN code sequence signal to generate the subsequent PN wiped signal. The subsequent PN wiped signal is further processed in the GNSS receiver 500 to detect presence of a satellite signal.

In one embodiment, the GNSS receiver 500 is used to acquire a single satellite signal. In another embodiment, the GNSS receiver 500 is used to acquire multiple satellite signals in a serial mode i.e. the GNSS receiver 500 acquires a first satellite signal before starting the process for acquiring a second satellite signal. In an embodiment, multiple GNSS receivers are used to track multiple satellite signals and each GNSS receiver tracks a single satellite signal. In another embodiment, multiple GNSS receivers are used to track a single satellite signal.

The plurality of delayed PN wiped signals is multiplied with the windowing function signal to generate the plurality of windowed signals. The integration of the plurality of windowed signals provides uniform probability of acquiring a satellite signal irrespective of the actual doppler frequency offset from the hypothesized frequency. This increases the sensitivity of GNSS receiver 500 as the acquisition time of a satellite signal is reduced. The probability of detection (PoD) of a satellite signal is uniformly high irrespective of the difference between the actual doppler frequency and the hypothesized frequency. The uniformly high PoD results in quicker detection of satellite signals by the GNSS receiver 500.

Figure 6:
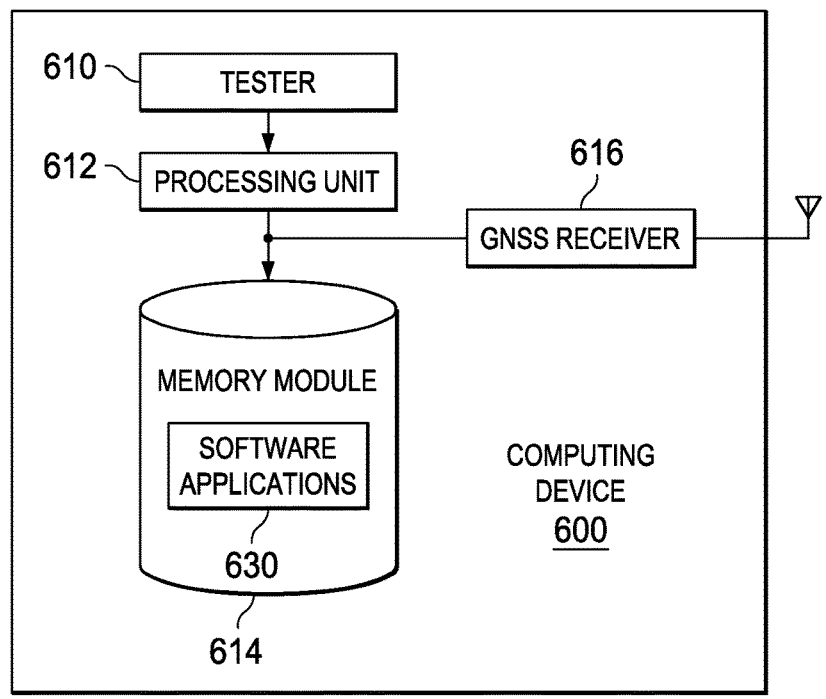
FIG. 6 illustrates a computing device with the GNSS receiver according to an embodiment.

FIG. 6 illustrates a computing device according to an embodiment. The computing device 600 is, or is incorporated into, a mobile communication device, such as a mobile phone, a personal digital assistant, a personal computer, or any other type of electronic system.

In some embodiments, the computing device 600 comprises a megacell or a system-on-chip (SoC) which includes a processing unit 612 such as a CPU (Central Processing Unit), a memory module 614 (e.g., random access memory (RAM)) and a tester 610. The processing unit 612 can be, for example, a CISC-type (Complex Instruction Set Computer) CPU, RISC-type CPU (Reduced Instruction Set Computer), or a digital signal processor (DSP). The memory module 614 (which can be memory such as RAM, flash memory, or disk storage) stores one or more software applications 630 (e.g., embedded applications) that, when executed by the processing unit 612, perform any suitable function associated with the computing device 600. The tester 610 comprises logic that supports testing and debugging of the computing device 600 executing the software application 630. For example, the tester 610 can be used to emulate a defective or unavailable component(s) of the computing device 600 to allow verification of how the component(s), were it actually present on the computing device 600, would perform in various situations (e.g., how the component(s) would interact with the software application 630). In this way, the software application 630 can be debugged in an environment which resembles post-production operation.

The processing unit 612 typically comprises memory and logic which store information frequently accessed from the memory module 614. The computing device 600 includes GNSS receiver 616 which is capable of communicating with a plurality of satellites over a wireless network. The GNSS receiver 616 is used to acquire a satellite signal and henceforth compute position and velocity of a user having the computing device 600. The GNSS receiver 616 is analogous to the GNSS receiver 200 in connections and operation. The GNSS receiver 616 provides uniform probability of acquiring a satellite signal irrespective of the actual doppler frequency offset from the hypothesized frequency. This increases the sensitivity of GNSS receiver 616 as the acquisition time of a satellite signal is reduced. The probability of detection (PoD) of a satellite signal is uniform which results in low power consumption in GNSS receiver 616.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A method of acquiring a satellite signal in a GNSS receiver, the method comprising:
   multiplying a received signal with a hypothesized doppler frequency signal to generate a frequency shifted signal;
   multiplying a PN code sequence signal with the frequency shifted signal to generate a PN wiped signal;
   multiplying a windowing function signal with the PN wiped signal to generate a windowed signal; and
   integrating, coherently, the windowed signal for a first predefined time to generate a coherent accumulated data.

2. The method of claim 1 further comprising integrating, non-coherently, the coherent accumulated data for a second predefined time.

3. The method of claim 1, wherein integrating, coherently, comprises summing values of the windowed signal in the first predefined time to generate the coherent accumulated data.

4. The method of claim 1, wherein the windowing function signal is one of a sinc window, a Power of cosine window, a Hamming window, a Bartlet window, a Kaiser window, a Tukey window, a Gaussian window, a Triangular window, a Hann window, a Welch window, a Parzen window, a Blackman window, and a Flat Top window.

5. The method of claim 2, wherein integrating, non-coherently, comprises one of summing absolute values of the coherent accumulated data and summing squares of the absolute values of the coherent accumulated data.

6. The method of claim 1 further comprising cyclically shifting the PN code sequence signal and multiplying cyclically shifted PN code sequence signal with the frequency shifted signal to generate a subsequent PN wiped signal.

7. The method of claim 1 further comprising delaying the frequency shifted signal to generate a delayed frequency shifted signal and multiplying the PN code sequence signal with the delayed frequency shifted signal to generate the subsequent PN wiped signal.

8. A method of acquiring a satellite signal in a GNSS receiver, the method comprising:
   multiplying a received signal with a hypothesized doppler frequency signal to generate a frequency shifted signal;
   multiplying a PN code sequence signal with the frequency shifted signal to generate a PN wiped signal;
   multiplying the PN wiped signal with a plurality of delayed windowing function signals to generate a plurality of windowed signals; and
   integrating, coherently, the plurality of windowed signals for a first predefined time to generate a plurality of coherent accumulated data.

9. The method of claim 8, wherein a windowing function signal is delayed by predefined time periods to generate the plurality of delayed windowing function signals.

10. The method of claim 8 further comprising integrating, non-coherently, the plurality of coherent accumulated data for a second predefined time.

11. The method of claim 8, wherein integrating, coherently, comprises summing values of the plurality of windowed signals in the first predefined time to generate the coherent accumulated data and integrating, non-coherently, comprises one of summing absolute values of the plurality of coherent accumulated data and summing squares of the absolute values of the plurality of coherent accumulated data.

12. A method of acquiring a satellite signal in a GNSS receiver, the method comprising:
multiplying a received signal with a hypothesized doppler frequency signal to generate a frequency shifted signal;
multiplying a PN code sequence signal with the frequency shifted signal to generate a PN wiped signal;
delaying the PN wiped signal by a predefined time periods to generate a plurality of delayed PN wiped signals;
multiplying a windowing function signal with the plurality of delayed PN wiped signals to generate a plurality of windowed signals; and
integrating, coherently, the plurality of windowed signals for a first predefined time to generate a plurality of coherent accumulated data.

13. The method of claim 12 further comprising integrating, non-coherently, the plurality of coherent accumulated data for a second predefined time.

14. The method of claim 12, wherein integrating, coherently, comprises summing values of the plurality of windowed signals in the first predefined time to generate the coherent accumulated data and integrating, non-coherently, comprises one of summing absolute values of the plurality of coherent accumulated data and summing squares of the absolute values of the plurality of coherent accumulated data.

15. A global navigation satellite system (GNSS) receiver comprising:
a doppler multiplication module configured to multiply a received signal with a hypothesized doppler frequency signal to generate a frequency shifted signal;
a PN multiplication module configured to multiply a PN code sequence signal with the frequency shifted signal to generate a PN wiped signal;
a window multiplication module configured to multiply a windowing function signal with the PN wiped signal to generate a windowed signal; and
a coherent integrator configured to integrate the windowed signal for a first predefined time to generate coherent accumulated data.

16. The GNSS receiver of claim 15 further comprising a non-coherent integrator configured to integrate the coherent accumulated data for a second predefined time.

17. The GNSS receiver of claim 15, wherein coherent integrator is configured to sum values of the windowed signal in the first predefined time to generate coherent accumulated data.

18. A global navigation satellite system (GNSS) receiver comprising:
a doppler multiplication module configured to multiply a received signal with a hypothesized doppler frequency signal to generate a frequency shifted signal;
a PN multiplication module configured to multiply a PN code sequence signal with the frequency shifted signal to generate a PN wiped signal;
a plurality of window multiplication modules configured to multiply the PN wiped signal with a plurality of delayed windowing function signals to generate a plurality of windowed signals; and
a plurality of coherent integrator configured to integrate coherently the plurality of windowed signals for a first predefined time to generate a plurality of coherent accumulated data.

19. The GNSS receiver of claim 18 further comprising a plurality of windowing function generators that generates the plurality of delayed windowing function signals, wherein a windowing function signal is delayed by predefined time periods in the plurality of windowing function generator to generate the plurality of delayed windowing function signals.

20. The GNSS receiver of claim 18 further comprising a non-coherent integrator configured to integrate non-coherently the plurality of coherent accumulated data.

21. A global navigation satellite system (GNSS) receiver comprising:
a doppler multiplication module configured to multiply a received signal with a hypothesized doppler frequency signal to generate a frequency shifted signal;
a PN multiplication module configured to multiply a PN code sequence signal with the frequency shifted signal to generate a PN wiped signal;
a plurality of delay modules configured to delay the PN wiped signal by predefined time periods to generate a plurality of delayed PN wiped signals;
a plurality of window multiplication modules to multiply the plurality of delayed PN wiped signals with a windowing function signal to generate a plurality of windowed signals;
a plurality of coherent integrators configured to integrate coherently the plurality of windowed signals for a first predefined time to generate a plurality of coherent accumulated data; and
a non-coherent integrator configured to integrate non-coherently the plurality of coherent accumulated data.

* * * * *